US008048934B2

(12) United States Patent
Jeon et al.

(10) Patent No.: US 8,048,934 B2
(45) Date of Patent: Nov. 1, 2011

(54) METHOD OF RECYCLING ACRYLIC RESIN, COMPOSITION FOR ACRYLIC ARTIFICIAL STONE, AND ARTICLE OF ARTIFICIAL STONE

(75) Inventors: Myeong Cheon Jeon, Yeosu-si (KR); Hyeong Gyu Ahn, Yeosu-si (KR); Jong Gap Kim, Yeosu-si (KR); Hae Mun Jung, Suwon-si (KR); Seung Hwa Jeong, Yeosu-si (KR); Bang Jun Park, Sunchon-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 502 days.

(21) Appl. No.: 12/285,529

(22) Filed: Oct. 8, 2008

(65) Prior Publication Data
US 2009/0099290 A1  Apr. 16, 2009

(30) Foreign Application Priority Data

Oct. 12, 2007  (KR) .................. 10-2007-0103042

(51) Int. Cl.
*C08J 11/04* (2006.01)
*B29B 17/00* (2006.01)

(52) U.S. Cl. .......... 521/40; 422/132; 422/135; 528/271; 528/272

(58) Field of Classification Search .................. 422/132, 422/135; 528/271, 272; 521/40
See application file for complete search history.

(56) References Cited

U.S. PATENT DOCUMENTS

| 3,888,912 | A | * | 6/1975 | Burguette | 560/205 |
| 4,786,756 | A | * | 11/1988 | Paparizos et al. | 562/599 |
| 2005/0053730 | A1 | | 3/2005 | Kwon | |

FOREIGN PATENT DOCUMENTS

KR  10-2005-0113678  2/2005

* cited by examiner

*Primary Examiner* — Terressa Boykin
(74) *Attorney, Agent, or Firm* — Lee & Morse, P.C.

(57) ABSTRACT

A composition for acrylic artificial stone, the composition including a (meth)acrylic monomer and an inorganic material. At least one of the (meth)acrylic monomer and the inorganic material may be contained in a component generated by decomposing a polymeric (meth)acrylic resin.

23 Claims, 2 Drawing Sheets

METHOD OF RECYCLING ACRYLIC RESIN, COMPOSITION FOR ACRYLIC ARTIFICIAL STONE, AND ARTICLE OF ARTIFICIAL STONE

BACKGROUND OF THE INVENTION

1. Field of the Invention

Embodiments relate to a method of recycling acrylic resin, a composition for acrylic artificial stone, and an article of artificial stone.

2. Description of the Related Art

Artificial marble is generally fabricated using an acrylic artificial marble, which is polymerized from acrylic and/or methacrylic monomers, or an unsaturated polyester artificial marble. Acrylic artificial marble has been in demand for a long time, as it can be widely used for various architectural elements, furniture, etc., e.g., counter tops, due to its excellent appearance, superior texture, and good weatherability.

When disposing of dust or scraps resulting from the preparation of acrylic artificial marble, or when disposing of products such as artificial marble architectural elements, furniture, etc., there may be problems in that the disposal of such waste by incinerating is difficult to implement due to the flameproof property of acrylic artificial marble. Further, the waste may contaminate soil in a landfill because the waste does not biodegrade.

Attempts to reutilize waste materials of artificial marble have been made. However, methods requiring dissolution of polymeric material, e.g., polymethylmethacrylate, in a matrix, e.g., methylmethacrylate, are restricted to polymeric materials having an average molecular weight of about 30,000 to about 150,000 at the highest.

Therefore, there is a need for a method to decomposing a polymeric (meth)acrylic resin and the re-use of products obtained thereby.

SUMMARY OF THE INVENTION

Embodiments are therefore directed to a method of recycling acrylic resin, a composition for acrylic artificial stone, and an article of artificial stone, which substantially overcome one or more of the problems due to the limitations and disadvantages of the related art.

It is therefore a feature of an embodiment to provide a method of recycling acrylic resin that produces a (meth) acrylic monomer-containing component.

It is therefore another feature of an embodiment to provide a composition that may be cured to form an article of artificial stone, e.g., marble, the composition including one or more of a (meth)acrylic monomer-containing component and an inorganic-containing component.

It is therefore another feature of an embodiment to provide an article of artificial stone that includes a (meth)acrylic polymer matrix and an inorganic material in the (meth)acrylic polymer matrix, at least one of the (meth)acrylic monomer and the inorganic material being contained in a component generated by decomposing a polymeric (meth)acrylic resin.

At least one of the above and other features and advantages may be realized by providing a method of decomposing a polymeric (meth)acrylic resin, the method including thermally decomposing the polymeric (meth)acrylic resin in a substantially oxygen-free atmosphere to generate a gas-phase product, and converting at least a portion of the gas-phase product to a (meth)acrylic monomer-containing component by condensing at least a portion of the gas-phase product.

The method may further include isolating an inorganic-containing component from a non-gas-phase product of the thermal decomposition. The inorganic-containing component may include aluminum oxide. The method may further include, after isolating the inorganic-containing component, oxidizing the inorganic-containing component to generate aluminum oxide. The oxidation may include heating the inorganic-containing component in an oxygen-containing atmosphere at a temperature of about 900° C. to about 1,200° C.

The (meth)acrylic monomer-containing component may have a viscosity less than that of the polymeric (meth)acrylic resin at room temperature. The polymeric (meth)acrylic resin may be a waste resin. The waste resin may include waste acrylic artificial stone, waste polymethylmethacrylate resin, or mixtures thereof. The polymeric (meth)acrylic resin may be a solid at room temperature.

The method may further include condensing a first portion of the gas-phase product generated by heating at a temperature of about 200° C. to about 250° C., and condensing a second portion of the gas-phase product generated by heating at a temperature of about 250° C. to about 450° C., the first and second portions being separate. The first portion may contain water, and the second portion may contain the (meth) acrylic monomer-containing component. The method may further include conducting at least one distillation of the (meth)acrylic monomer-containing component after condensing the (meth)acrylic monomer-containing component.

At least one of the above and other features and advantages may also be realized by providing a composition for acrylic artificial stone, the composition including a (meth)acrylic monomer, and an inorganic material. At least one of the (meth)acrylic monomer and the inorganic material may be contained in a component generated by decomposing a polymeric (meth)acrylic resin.

The polymeric (meth)acrylic resin may be decomposed using a method that includes thermally decomposing the polymeric (meth)acrylic resin in a substantially oxygen-free atmosphere to generate a gas-phase product, and converting at least a portion of the gas-phase product to a (meth)acrylic monomer-containing component by condensing at least a portion of the gas-phase product. The composition may further include particles of pulverized acrylic artificial stone, the particles having a size of about 0.1 mm to about 5 mm.

The (meth)acrylic monomer may form at least a portion of a (meth)acrylic resin syrup, the inorganic material may form about 0.1 to about 90% by weight of an inorganic filler, and the composition may include about 100 weight parts of the (meth)acrylic resin syrup, about 100 to about 200 weight parts of the inorganic filler, about 0.1 to about 10 weight parts of the crosslinking agent, and about 0.1 to about 10 weight parts of the polymerization initiator.

The (meth)acrylic monomer may be combined with a second (meth)acrylic monomer and a poly(meth)acrylate in the (meth)acrylic resin syrup, about 5 to about 80% by weight of the (meth)acrylic resin syrup may be the second (meth)acrylate monomer, the second (meth)acrylic monomer may include at least one of methacrylic acid, methyl methacrylate, ethyl methacrylate, isopropyl methacrylate, n-butyl methacrylate, or 2-ethyl hexyl methacrylate, and about 5 to about 80% by weight of the (meth)acrylic resin syrup is the poly (meth)acrylate.

The inorganic filler may include at least one of calcium carbonate, aluminum hydroxide, silica, alumina, barium sulfate, or magnesium hydroxide. The composition may include a crosslinking agent, and the crosslinking agent may include one or more of ethylene glycol dimethacrylate, propyleneglycol dimethacrylate, glycerol trimethacrylate, trimethylpropane trimethacrylate, bisphenol A, or dimethacrylate.

At least one of the above and other features and advantages may also be realized by providing an article of artificial stone, including a (meth)acrylic polymer matrix, and an inorganic material in the (meth)acrylic polymer matrix. The (meth)acrylic polymer matrix may be a polymer of a (meth)acrylic monomer, and at least one of the (meth)acrylic monomer and the inorganic material may be contained in a component generated by decomposing a polymeric (meth)acrylic resin.

The polymeric (meth)acrylic resin may be decomposed using a method that includes thermally decomposing the polymeric (meth)acrylic resin in a substantially oxygen-free atmosphere to generate a gas-phase product, and converting at least a portion of the gas-phase product to a (meth)acrylic monomer-containing component by condensing at least a portion of the gas-phase product.

At least one of the above and other features and advantages may also be realized by providing a method of making an article of artificial stone, the method including preparing a composition, and curing the composition. The composition may include a (meth)acrylic monomer and an inorganic material, at least one of the (meth)acrylic monomer and the inorganic material being contained in a component generated by decomposing a polymeric (meth)acrylic resin.

At least one of the above and other features and advantages may also be realized by providing a method of making an article of artificial stone, the method including thermally decomposing a polymeric (meth)acrylic resin in a substantially oxygen-free atmosphere to generate a gas-phase product, converting at least a portion of the gas-phase product to a (meth)acrylic monomer-containing component by condensing at least a portion of the gas-phase product, forming a composition that includes a (meth)acrylic monomer and an inorganic material, the (meth)acrylic monomer being obtained from the (meth)acrylic monomer-containing component, and curing the composition.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION OF THE INVENTION

Figure 1:
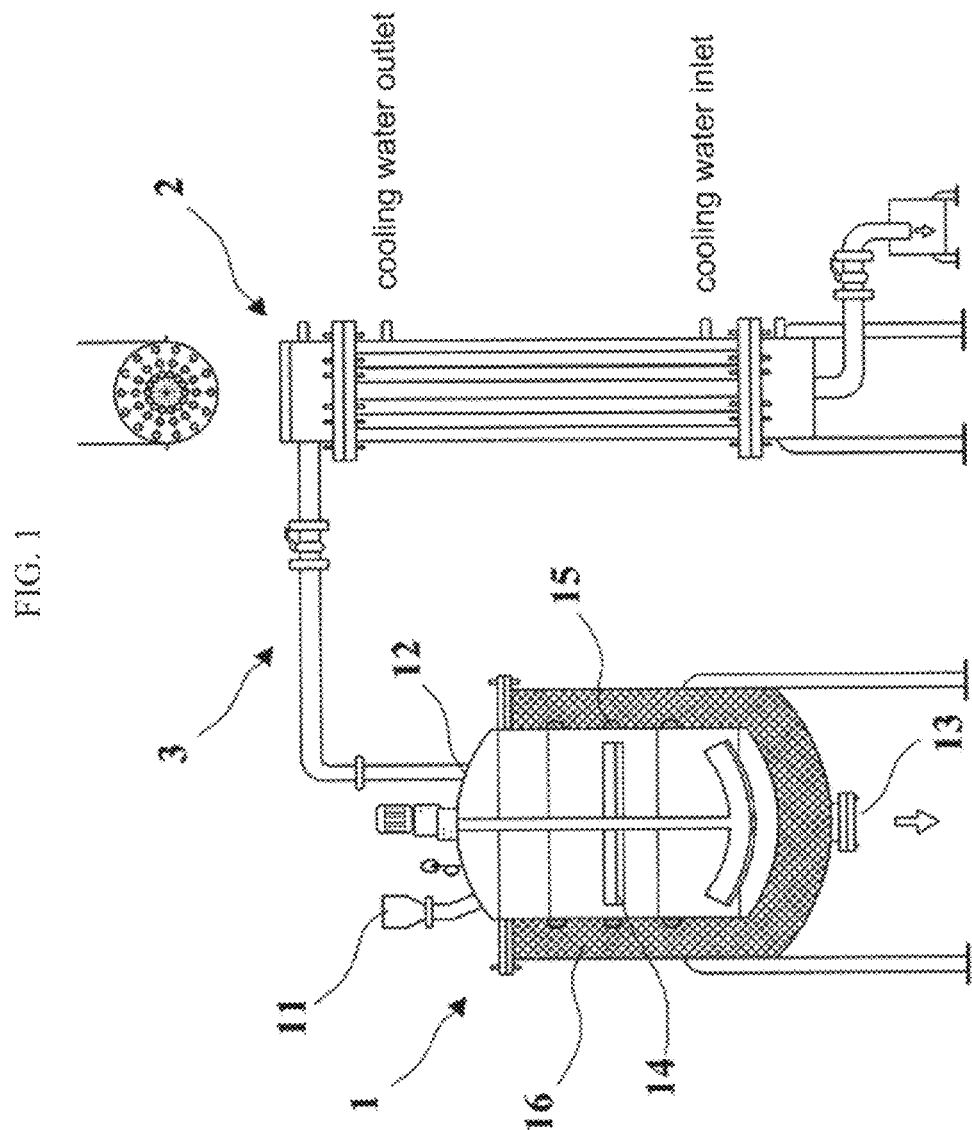
FIG. 1 illustrates an example apparatus for extracting a (meth)acrylate component and/or an inorganic-containing component from a polymeric (meth)acrylic resin according to an embodiment.
Figure 2:
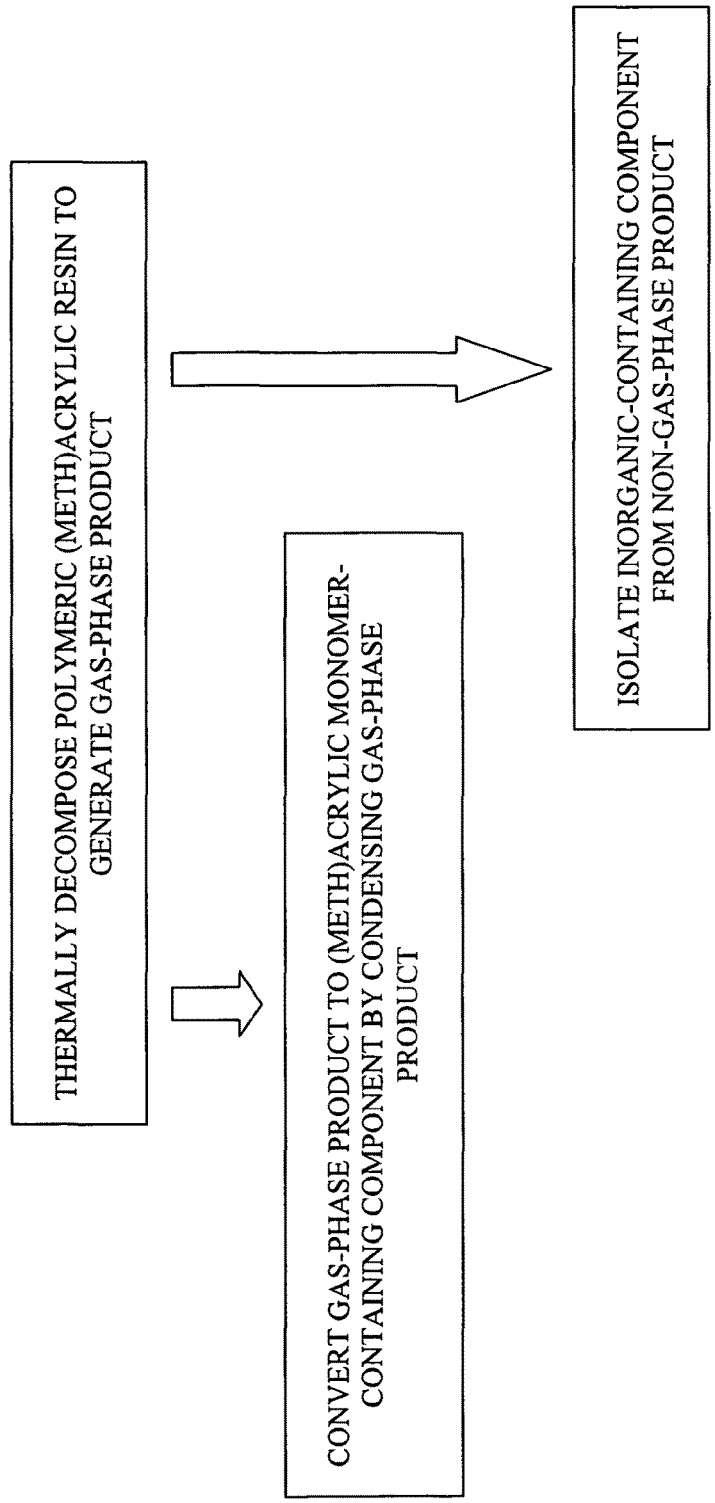
FIG. 2 illustrates a flow chart of a method for extracting a (meth)acrylate component and/or an inorganic-containing component from a polymeric (meth)acrylic resin according to an embodiment.

Korean Patent Application No. 2007-103042, filed on Oct. 12, 2007, in the Korean Intellectual Property Office, and entitled: "Recycling Method of Waste Acrylic Resin and a Composition for Acrylic Artificial Marble Using Recycled (Meth)acrylic Monomer," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a crosslinking agent" may represent a single compound, e.g., ethylene glycol dimethacrylate, or multiple compounds in combination, e.g., ethylene glycol dimethacrylate mixed with propyleneglycol dimethacrylate.

As used herein, molecular weights of polymeric materials are weight average molecular weights, unless otherwise indicated.

As used herein, the term "weight parts" refers to a unit of weight measurement, e.g., grams (g), kilograms (kg), ounces (oz), pounds (lb), etc. For example, where a composition is composed of 60 weight parts of component A and 70 weight parts of component B, the composition may have a total weight of 130 g, 130 kg, 130 oz, 130 lb, etc.

As used herein, the terms "acrylic resin" and "(meth)acrylic resin" are used interchangeably to refer to resins of acrylate monomers, methacrylate monomers, mixtures thereof, etc. Similarly, an "acrylic artificial marble" refers to an artificial marble formed of acrylate monomers, methacrylate monomers, mixtures thereof, etc.

An embodiment provides a method of decomposing a polymeric (meth)acrylic resin.

In an embodiment, the polymeric (meth)acrylic resin, e.g., waste (meth)acrylic resin such as artificial marble, etc., may be put into a reactor and heated to 200~450° C. so that a decomposed product in gas-phase, which results from thermal decomposition, may be recovered. In an implementation, the thermal decomposition may be performed in a substantially oxygen-free atmosphere. In an implementation, the reactor may be purged with an inert gas, e.g., nitrogen, argon, etc, or the reactor may be evacuated.

The waste resin may be a solid material and may include one or more (meth)acrylic resins containing a (meth)acrylic polymer. For example, acrylic artificial marble, polymethylmethacrylate, or mixtures thereof, etc., may be used. Further, the waste resin may include waste acrylic-based artificial marble, ground waste material of polymethylmethacrylate, dust, remnants, scraps, etc. that are generated during processing, e.g., cutting, etc. The weight average molecular weight of the (meth)acrylic resin is not particularly limited and may be, e.g., greater than 150,000.

For the acrylic artificial marble, a (meth)acrylate monomer-based acrylic artificial marble may be used. Such an artificial marble may have been initially produced by, e.g., curing a slurry that includes a (meth)acrylic resin syrup containing (meth)acrylate monomer and poly(meth)acrylate and, e.g., inorganic fillers, particles added for aesthetic reasons, crosslinking monomers, etc. For the polymethylmethacrylate, a methylmethacrylate monomer-based polymethylmethacrylate may be used, e.g., polymeric materials used for light guide panel, advertisement panels, etc.

In an implementation, the waste resin may be put into a reactor and then thermally decomposed in the reactor while stirring and heating. The reactor is preferably a sealed reactor, though sealing is not required. In an implementation, the reactor may be a pressure vessel. In other implementations, the reactor may be maintained at atmospheric pressure or a slightly elevated pressure.

The thermal decomposition may include increasing the temperature, e.g., in steps, to about 200° C.~250° C. and up to about 450° C. Preferably, decomposition product in a first gas-phase may be recovered at about 200° C. to about 250° C. Then, decomposition product in a second gas-phase may be recovered at about 250° C. to about 450° C. In other implementation, the thermal decomposition may be conducted while the reactor temperature is increased continuously from about 250° C. to about 450° C.

In the present invention, in a case of a material containing artificial marble, a combined water of hydroxyl group in aluminum hydroxide, which may be used as a filler in the artificial marble, may be thermally decomposed at about 200° C. to about 250° C. The water may be recovered as a separate fraction or as part of the decomposition product in the first gas-phase. The water may be recovered from the decomposed product in the first gas-phase using a condenser.

A (meth)acrylic monomer may be recovered from the decomposition of poly(meth)acrylate at about 250° C. to about 450° C., preferably about 350° C. to about 450° C., while the temperature of the material in the reactor is continuously increased. A (meth)acrylic monomer may be recovered at from about 250° C. and higher, but when the condition of the apparatus for thermal decomposition and chemical properties are taken into consideration, a (meth)acrylic monomer recovered at about 350° C. or more is preferred.

The (meth)acrylic monomer recovered by the above-described method may be used by itself, or in combination with other materials, for various uses. In an implementation, purity of the recovered material may be further enhanced using subsequent or additional processes. For example, multi-stage distillation of the (meth)acrylic monomer may be preformed so as to improve the purity.

In an embodiment, where the waste material includes inorganic materials, an inorganic-containing component may be recovered from the waste material, instead of, or in addition to, recovering a (meth)acrylic monomer-containing component. For example, where waste acrylic artificial marble is being recycled, aluminum oxide may be recovered, e.g., from materials remaining after recovery of a (meth)acrylic monomer component. The recovered aluminum oxide may be reused as, e.g., an artificial marble additive, a ceramic enamel, etc.

In an implementation, aluminum oxide may be recovered by collecting materials remaining in the reactor after recovering the (meth)acrylic monomer. The collected materials may be oxidized in an oxidative atmosphere, e.g., an oxygen-containing atmosphere, in an electric furnace, e.g., at about 800° C. to about 1200° C., preferably about 900° C. to 1200° C. Conducting the thermal decomposition at such temperatures may allow the recovery of only, or primarily, aluminum oxide, while other components are burned up.

An embodiment provides a composition including one or more of a recovered, i.e., recycled, (meth)acrylic-containing component, e.g., a (meth)acrylic monomer-containing material, or a recovered inorganic-containing component, e.g., an aluminum oxide-containing material, which may be used to fabricate, e.g., an acrylic artificial marble. The (meth)acrylic monomer and/or aluminum oxide components may be obtained by recycling a polymeric (meth)acrylic resin using the above-described embodiment.

In an implementation, a composition for acrylic artificial marble may include (meth)acrylic resin syrup that contains recovered (meth)acrylic monomer, an inorganic filler, a crosslinking agent, and a polymerization initiator.

Preferably, the (meth)acrylic resin syrup includes the recovered (meth)acrylic monomer in an amount of about 0.1 to about 90% by weight, more preferably about 1% by weight to about 70% by weight, and most preferably about 10 to about 55% by weight.

In an implementation, the (meth)acrylic resin syrup may include about 0.1 to about 90% by weight of the recovered (meth)acrylate monomer, as well as about 5 to about 80% by weight of (meth)acrylate monomer that includes one or more of methacrylic acid, methyl methacrylate, ethyl methacrylate, isopropyl methacrylate, n-butyl methacrylate, 2-ethyl hexyl methacrylate. The (meth)acrylic resin syrup may also include about 5 to about 80% by weight of poly(meth)acrylate.

In an implementation, the composition for acrylic artificial marble may include about 100 weight parts of the (meth)acrylic resin syrup, e.g., (meth)acrylic resin syrup that contains about 0.1 to about 90% by weight of the recovered (meth)acrylic monomer, as well as about 100 to about 200 weight parts of the inorganic filler, about 0.1 to about 10 weight parts of the crosslinking agent, and about 0.1 to about 10 weight parts of the polymerization initiator.

In an implementation, the composition may further include marble chips, e.g., natural or artificial marble chips. Artificial marble chips may be prepared by, e.g., pulverizing artificial marble into particles having a size of about 0.1 mm to about 10 mm, preferably about 0.1 mm to about 5 mm. The artificial marble that is pulverized may be, e.g., artificial marble prepared using the above-described composition for artificial marble having recovered (meth)acrylic monomer and/or recovered aluminum oxide therein.

The recovered aluminum oxide may be used for the inorganic filler. The inorganic filler may also include, e.g., calcium carbonate, aluminum hydroxide, silica, alumina, barium sulfate, or magnesium hydroxide, which may be used alone, in combination with one another, or in combination with the recovered inorganic component such as recovered aluminum oxide.

The crosslinking agent may include one or more of, e.g., ethyleneglycol dimethacrylate, propyleneglycol dimethacrylate, glycerol trimethacrylate, trimethylpropane trimethacrylate, bisphenol A, or dimethacrylate.

The polymerization initiator may include, e.g., peroxides such as benzoyl peroxide, lauroyl peroxide, butyl hydroperoxide, cumyl hydroperoxide, etc., and/or azo compounds such as azobisisobutyronitrile (AIBN), etc.

Artificial marble may be prepared from the above-described composition using generally known curing methods.

An embodiment provides an apparatus for decomposing a polymeric (meth)acrylic resin such as a waste resin, into a (meth)acrylic monomer-containing component and/or an inorganic-containing component.

FIG. 1 illustrates an example apparatus for extracting the (meth)acrylate component and/or the inorganic-containing component from the polymeric (meth)acrylic resin according to an embodiment.

Referring to FIG. 1, the reactor (1) may include an input opening (11), an extraction opening (12) at an upper part of the reactor (1) and connected to a condenser (2), and a drain (13) at a lower part of the reactor for discharging remnants. The condenser (2) may be connected to the reactor (1) via a pipe (3).

As shown in the plan-view inset in the upper right corner of FIG. 1, the condenser (2) may have a plurality of cooling elements therein. Examples of the condenser (2) include an air cooling type, a water cooling type, a rectangular type, a counter-flow type, etc. In an implementation, the condenser may be a water-cooled condenser of the counter-flow type.

The waste resin may be put into the reactor (1) and stirred uniformly by a stirring blade (14) provided in the reactor (1), which may minimize settling of the waste resin. The stirring blade (14) may be connected to a power generating unit such as a motor. A heating element (15) may be disposed in an external part of the reactor (1). The reactor (1) may further include a heat insulating material (16) covering the reactor (1). The heat insulating material may reduce energy consumption by preventing heat loss while the reactor (1) is being heated.

A sealed-type reactor is preferred as the reactor (1) such that, as the pressure thereof increases while the reactor is heated, volatile products are pushed and moved toward the condenser (2) through the extraction opening (12). The reactor (1) may be completely sealed from the atmosphere, open to the atmosphere via the condenser (2), or an outlet to the atmosphere may be partially restricted so as to develop a pressure difference between the inside and outside of the reactor.

The following Examples and Comparative Examples are provided in order to set forth particular details of one or more embodiments. However, it will be understood that the embodiments are not limited to the particular details described.

EXAMPLES

Examples 1 through 3

Recovery of Methylmethacrylate and/or Aluminum Oxide from Waste (Meth)Acrylic Resin

Example 1

1000 weight parts of acrylic artificial marble was put into a reactor equipped with an agitator and a condenser, and was heated to 450° C. Condensate of the thermal decomposition was extracted through the condenser at 200° C. and then the extract was discarded, which continued until the temperature reached 250° C. Then, extract was collected until the temperature reached 450° C., and 370 weight parts of an extract was prepared by purifying the extract through a three-stage distillation tower. Materials remaining in the reactor after the thermal decomposition were collected and oxidized in an electric furnace at a temperature of 800° C.-1200° C., and 440 weight parts of an inorganic-containing component was recovered.

Example 2

700 weight parts of transparent light guide panel prepared with polymethylmethacrylate and waste polymethylmethacrylate articles were put into a reactor equipped with a condenser and an agitator, and were heated to 450° C. Condensate was extracted through the condenser at 200° C. and the extract was discarded, which continued until the temperature reached 250° C. Then, extract was collected until the temperature reached 450° C., and 610 weight parts of an extract was prepared by purifying the extract through a three-stage distillation tower.

Example 3

500 weight parts of acrylic artificial marble and 500 weight parts of transparent light guide plates prepared with polymethylmethacrylate and waste polymethylmethacrylate articles were put into a reactor equipped with a condenser and an agitator, and were heated to 450° C. Condensate was extracted through the condenser at 200° C. and the extract was discarded, which continued until the temperature reached 250° C. Then, extract was collected until the temperature reached 450° C., and 620 weight parts of extracts was obtained by purifying the extract through the three-stage distillation tower. Materials remaining in the reactor were collected and oxidized in an electric furnace at a temperature of 800° C.-1200° C., and 220 weight parts of collection was recovered.

Acrylic artificial marble prepared as described in Examples 4~6 below was prepared using the extracts of methylmethacrylate monomer obtained in Examples 1~3, respectively. Results from tests of properties of the acrylic artificial marbles thus prepared are shown in Table 1.

Examples 4-6

Preparation of Artificial Marble by Using Methylmethacrylate Extracted in Examples 1-3

Example 4

25 weight parts of polymethylmethacrylate having an average molecular weight of 85,000, 30 weight parts of methylmethacrylate, and 45 weight parts of the extracts of Example 1 were fed to a reactor, then heated to 40~50° C., to prepare a (meth)acrylic resin syrup. Then, 155 weight parts of aluminum hydroxide, 2 weight parts of trimethyl propane tri methacrylate, and 2 weight parts of lauroyl peroxide were combined with all of the (meth)acrylic resin syrup in a mixer to prepare a slurry. The slurry was poured into a molding frame and reacted in an oven having a temperature of 80° C. to prepare an artificial marble.

Example 5

25 weight parts of polymethylmethacrylate having an average molecular weight of 85,000, 30 weight parts of methylmethacrylate, and 45 weight parts of the extracts of Example 2 were fed to a reactor, then heated to 40~50° C., to prepare a (meth)acrylic resin syrup. Then, 155 weight parts of aluminum hydroxide, 2 weight parts of trimethyl propane trimethacrylate, and 2 weight parts of lauroyl peroxide were combined with all of the (meth)acrylic resin syrup in a mixer to prepare a slurry for artificial marble. The slurry was poured into a molding frame and reacted in an oven having a temperature of 80° C. to prepare an artificial marble.

Example 6

25 weight parts of polymethylmethacrylate having an average molecular weight of 85,000, 30 weight parts of methylmethacrylate, and 45 weight parts of the extracts of Example 3 were fed to a reactor, then heated to 40~50° C., to prepare a (meth)acrylic resin syrup. Then, 155 weight parts of aluminum hydroxide, 2 weight parts of trimethyl propane trimethacrylate, and 2 weight parts of lauroyl peroxide were combined with all of the (meth)acrylic resin syrup in a mixer to prepare a slurry. The slurry was poured into a molding frame and reacted in an oven having a temperature of 80° C. to prepare an artificial marble.

Comparative Example 1

To prepare a comparative artificial marble, 25 weight parts of polymethylmethacrylate having an average molecular weight of 85,000 and 75 weight parts of methylmethacrylate were fed to a reactor, then heated to 40~50° C., to prepare a (meth)acrylic resin syrup. Then, 155 weight parts of aluminum hydroxide, 2 weight parts of trimethyl propane trimethacrylate, and 2 weight parts of lauroyl peroxide were combined with all of the (meth)acrylic resin syrup in a mixer to prepare a slurry. The slurry was poured into a molding frame and reacted in an oven having a temperature of 80° C. to prepare an artificial marble.

The physical properties of the artificial marbles were measured as follows, and the results are shown in Table 1 below. Tensile strength was measured in accordance with ASTM D-638 (unit: psi). Flexural strength was measured in accordance with ASTM D-790 (unit: psi). Elongation was measured in accordance with ASTM D-638 (unit: %). Impact strength was measured in accordance with ASTM D-256 (unit: ft-lbs/in).

TABLE 1

|  | Comp. Example 1 | Example 4 | Example 5 | Example 6 |
|---|---|---|---|---|
| Tensile strength | 6,000 | 6,050 | 5,930 | 6,070 |
| Flexural strength | 10,400 | 10,100 | 9,900 | 10,500 |
| Elongation | 2.50 | 2.49 | 2.48 | 2.51 |
| Impact strength | 0.28 | 0.281 | 0.280 | 0.279 |

As shown in Table 1, the artificial marbles of Examples 4-6, which were prepared with the recovered methacrylate according to embodiments, show physical properties that are as good as the comparative artificial marble, which was not prepared with recovered methacrylate. Further, it is possible to use the collections taken from Examples 1 and 3 for general use, since the collections have 99.95% purity as measured by XRF (not shown in Table 1).

As described above, embodiments may provide a recycling method for recovering a (meth)acrylic monomer by thermal decomposition of waste (meth)acrylic resin and/or recovering aluminum oxide from an aluminum-component containing material such as waste artificial marble. The recycling method may be suitable for recycling waste resin having a wide range of average molecular weights, and may be used to recycle, e.g., transparent polymethylmethacrylate. Thus, embodiments may provide an environmentally friendly recycling method for waste artificial marble that eliminates the need to bury or landfill the waste artificial marble. Further, embodiments may provide an economical method of recycling that may utilize waste residues such as dust resulting from sawing operations used in the production of artificial marble. Thus, embodiments may provide for the recycling of a polymeric (meth)acrylic resin, e.g., a waste product containing (meth)acrylate polymer such as artificial marble, and a composition including one or more components obtained by recycling the polymeric (meth)acrylic resin.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of decomposing a polymeric (meth)acrylic resin, the method comprising:
    thermally decomposing the polymeric (meth)acrylic resin in a substantially oxygen-free atmosphere to generate a gas-phase product; and
    converting at least a portion of the gas-phase product to a (meth)acrylic monomer-containing component by condensing at least a portion of the gas-phase product.

2. The method as claimed in claim 1, further comprising isolating an inorganic-containing component from a non-gas-phase product of the thermal decomposition.

3. The method as claimed in claim 2, wherein the inorganic-containing component includes aluminum oxide.

4. The method as claimed in claim 2, further comprising, after isolating the inorganic-containing component, oxidizing the inorganic-containing component to generate aluminum oxide.

5. The method as claimed in claim 4, wherein the oxidation includes heating the inorganic-containing component in an oxygen-containing atmosphere at a temperature of about 900° C. to about 1,200° C.

6. The method as claimed in claim 1, wherein the (meth)acrylic monomer-containing component has a viscosity less than that of the polymeric (meth)acrylic resin at room temperature.

7. The method as claimed in claim 1, wherein the polymeric (meth)acrylic resin is a waste resin.

8. The method as claimed in claim 7, wherein the waste resin includes waste acrylic artificial stone, waste polymethylmethacrylate resin, or mixtures thereof at least some of which has a weight average molecular weight of greater than 150,000.

9. The method as claimed in claim 1, wherein the polymeric (meth)acrylic resin is a solid at room temperature.

10. The method as claimed in claim 1, further comprising:
    condensing a first portion of the gas-phase product generated by heating at a temperature of about 200° C. to about 250° C.; and
    condensing a second portion of the gas-phase product generated by heating at a temperature of about 250° C. to about 450° C., the first and second portions being separate.

11. The method as claimed in claim 10, wherein:
    the first portion contains water, and
    the second portion contains the (meth)acrylic monomer-containing component.

12. The method as claimed in claim 1, further comprising conducting at least one distillation of the (meth)acrylic monomer-containing component after condensing the (meth) acrylic monomer-containing component.

13. A composition for acrylic artificial stone, the composition comprising:
   a (meth)acrylic monomer; and
   an inorganic material, wherein:
   at least one of the (meth)acrylic monomer and the inorganic material is contained in a component generated by decomposing a polymeric (meth)acrylic resin.

14. The composition as claimed in claim 13, wherein the polymeric (meth)acrylic resin is decomposed using a method that includes:
   thermally decomposing the polymeric (meth)acrylic resin in a substantially oxygen-free atmosphere to generate a gas-phase product; and
   converting at least a portion of the gas-phase product to a (meth)acrylic monomer-containing component by condensing at least a portion of the gas-phase product.

15. The composition as claimed in claim 13, further comprising particles of pulverized acrylic artificial stone, the particles having a size of about 0.1 mm to about 5 mm.

16. The composition as claimed in claim 13, wherein:
   the (meth)acrylic monomer forms about 0.1 to about 90% by weight of a (meth)acrylic resin syrup,
   the inorganic material forms at least a portion of an inorganic filler, and
   the composition includes:
      about 100 weight parts of the (meth)acrylic resin syrup,
      about 100 to about 200 weight parts of the inorganic filler,
      about 0.1 to about 10 weight parts of the crosslinking agent, and
      about 0.1 to about 10 weight parts of the polymerization initiator.

17. The composition as claimed in claim 16, wherein the (meth)acrylic monomer is combined with a second (meth)acrylic monomer and a poly(meth)acrylate in the (meth)acrylic resin syrup,
   about 5 to about 80% by weight of the (meth)acrylic resin syrup is the second (meth)acrylate monomer,
   the second (meth)acrylic monomer includes at least one of methacrylic acid, methyl methacrylate, ethyl methacrylate, isopropyl methacrylate, n-butyl methacrylate, or 2-ethyl hexyl methacrylate, and
   about 5 to about 80% by weight of the (meth)acrylic resin syrup is the poly(meth)acrylate.

18. The composition as claimed in claim 16, wherein the inorganic filler includes at least one of calcium carbonate, aluminum hydroxide, silica, alumina, barium sulfate, or magnesium hydroxide.

19. The composition as claimed in claim 16, wherein:
   the composition includes a crosslinking agent, and
   the crosslinking agent includes one or more of ethylene glycol dimethacrylate, propyleneglycol dimethacrylate, glycerol trimethacrylate, trimethylpropane trimethacrylate, bisphenol A, or dimethacrylate.

20. An article of artificial stone, comprising:
   a (meth)acrylic polymer matrix; and
   an inorganic material in the (meth)acrylic polymer matrix, wherein:
   the (meth)acrylic polymer matrix is a polymer of a (meth)acrylic monomer, and
   at least one of the (meth)acrylic monomer and the inorganic material is contained in a component generated by decomposing a polymeric (meth)acrylic resin.

21. The article as claimed in claim 20, wherein the polymeric (meth)acrylic resin is decomposed using a method that includes:
   thermally decomposing the polymeric (meth)acrylic resin in a substantially oxygen-free atmosphere to generate a gas-phase product; and
   converting at least a portion of the gas-phase product to a (meth)acrylic monomer-containing component by condensing at least a portion of the gas-phase product.

22. A method of making an article of artificial stone, the method comprising:
   preparing a composition; and
   curing the composition, wherein:
   the composition includes a (meth)acrylic monomer and an inorganic material, at least one of the (meth)acrylic monomer and the inorganic material being contained in a component generated by decomposing a polymeric (meth)acrylic resin.

23. A method of making an article of artificial stone, the method comprising:
   thermally decomposing a polymeric (meth)acrylic resin in a substantially oxygen-free atmosphere to generate a gas-phase product;
   converting at least a portion of the gas-phase product to a (meth)acrylic monomer-containing component by condensing at least a portion of the gas-phase product;
   forming a composition that includes a (meth)acrylic monomer and an inorganic material, the (meth)acrylic monomer being obtained from the (meth)acrylic monomer-containing component; and
   curing the composition.

* * * * *